United States Patent
Deivasigamani et al.

(10) Patent No.: US 9,020,499 B2
(45) Date of Patent: *Apr. 28, 2015

(54) FAST CELL SELECTION IN A MOBILE WIRELESS DEVICE

(71) Applicant: Apple Inc., Cupertino, CA (US)

(72) Inventors: Giri Prassad Deivasigamani, San Jose, CA (US); Venkatasubramanian Ramasamy, San Jose, CA (US); Sharad Garg, San Jose, CA (US); Srinivasan Vasudevan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/663,342

(22) Filed: Oct. 29, 2012

(65) Prior Publication Data

US 2013/0053093 A1    Feb. 28, 2013

Related U.S. Application Data (63) Continuation of application No. 12/950,691, filed on Nov. 19, 2010, now Pat. No. 8,301,145.

(60) Provisional application No. 61/358,335, filed on Jun. 24, 2010.

(51) Int. Cl.
  *H04W 4/00* (2009.01)
  *H04W 48/20* (2009.01)
  *H04W 64/00* (2009.01)

(52) U.S. Cl.
  CPC ............ *H04W 48/20* (2013.01); *H04W 64/003* (2013.01)

(58) Field of Classification Search
  CPC ..... H04W 64/00; H04W 84/12; H04W 88/12; H04W 88/06; H04W 72/048; H04W 72/0493; H04W 72/10; H04W 76/048; H04W 85/005; H04W 36/12; H04W 28/26; H04W 36/005; H04W 72/04; H04W 36/08; H04W 36/10; H04W 72/02; H04W 84/005; H04B 17/0025; H04B 1/692; H04B 7/022; H04B 7/15542; H04M 15/00; H04M 1/72572; H04M 2250/10; H04M 7/1205; H04L 41/12; H04L 43/0811; H04L 5/0058; H04L 5/006; H04L 63/10
  USPC .................... 455/426, 450, 525, 63.1, 67.13; 370/331, 332, 333; 375/260
  See application file for complete search history.

(56) References Cited

U.S. PATENT DOCUMENTS

| | | |
|---|---|---|
| 4,144,411 A | 3/1979 | Frenkiel |
| 5,394,158 A | 2/1995 | Chia |

(Continued)

FOREIGN PATENT DOCUMENTS

| | | |
|---|---|---|
| CN | 1960570 | 5/2007 |
| CN | 10139540 | 3/2009 |

OTHER PUBLICATIONS

Singapore Patent Application No. 201207307-8—Invitation to Respond to Written Opinion dated Feb. 7, 2014.

(Continued)

*Primary Examiner* — Nimesh Patel
(74) *Attorney, Agent, or Firm* — Womble Carlyle Sandridge & Rice, LLP (57) ABSTRACT

A method and apparatus for fast cell selection by a mobile wireless device. The mobile wireless device detects when a first wireless cell fails a set of stored suitability criteria and searches for and locates a set of candidate wireless cells to associate with. The mobile wireless device measures at least one received signal metric for each candidate wireless cell in the set of candidate wireless cells. When a candidate cell in the set of candidate wireless cells is identically the first wireless cell, the mobile wireless device evaluates the suitability of the candidate wireless cell using the stored set of suitability criteria for the first wireless cell and the measured at least one received signal metric for the candidate wireless cell. The mobile wireless communication device associates with the candidate wireless cell when the candidate wireless cell meets the stored set of suitability criteria.

20 Claims, 8 Drawing Sheets

(56) References Cited

U.S. PATENT DOCUMENTS

| | | | |
|---|---|---|---|
| 6,223,037 B1 | 4/2001 | Parkkila | |
| 6,771,964 B1 | 8/2004 | Einola | |
| 6,816,729 B1 | 11/2004 | Halonen | |
| 7,079,848 B2 | 7/2006 | Das et al. | |
| 7,277,709 B2 | 10/2007 | Vadgama | |
| 8,301,145 B2* | 10/2012 | Deivasigamani et al. | 455/436 |
| 2004/0092265 A1 | 5/2004 | Chitrapu et al. | |
| 2004/0266436 A1 | 12/2004 | Jaakkola et al. | |
| 2004/0266437 A1* | 12/2004 | Vempati et al. | 455/436 |
| 2004/0266474 A1 | 12/2004 | Petrus | |
| 2005/0197122 A1* | 9/2005 | Sliva | 455/436 |
| 2005/0202821 A1 | 9/2005 | Pischella | |
| 2007/0049324 A1 | 3/2007 | Sambhwani et al. | |
| 2007/0275717 A1* | 11/2007 | Edge et al. | 455/434 |
| 2008/0031368 A1 | 2/2008 | Lindoff et al. | |

OTHER PUBLICATIONS

Chinese Application No. 201110169885.4—Office Action dated Aug. 27, 2013.

Taiwan Application No. 100119620—Office Action dated Jul. 19, 2013.

International Search Report dated Oct. 18, 2011 in PCT Application No. PCT/US2011/038217.

Written Opinion dated Oct. 18, 2011 in PCT Application No. PCT/US2011/038217.

European Search Report dated Mar. 6, 2012, for European Patent Application No. EP11170987.

"3rd Generation partnership Project: Technical Specification Group Radio Access Network; User Equipment (UE) Procedures in Idle Mode and Procedures for Cell Reselection in Connected Mode (Release 9)", 3GPP Standard; 3GPP TS 25.304, 3rd Generation Partnership Project (3GPP), Mobile Competence Centre; 650, Route des Lucioles; F-06921 Sophia-Antipolis Cedex; France, retrieved on Jun. 17, 2010, pp. 1-50.

* cited by examiner

FAST CELL SELECTION IN A MOBILE WIRELESS DEVICE

PRIORITY

This application is a continuation of and claims priority to U.S. patent application Ser. No. 12/950,691 entitled "FAST CELL SELECTION IN A MOBILE WIRELESS DEVICE" filed Nov. 19, 2010 (issuing as U.S. Pat. No. 8,301,145), which claims priority to U.S. Provisional Patent Application Ser. No. 61/358,335 entitled, "METHOD AND APPARATUS FOR FAST CELL SELECTION IN A MOBILE WIRELESS DEVICE" filed Jun. 24, 2010, each of the foregoing being incorporated herein by reference in its entirety.

TECHNICAL FIELD

The described embodiments relate generally to wireless mobile communications. More particularly, a method is described for fast cell selection in a mobile wireless communication device.

BACKGROUND OF THE INVENTION

Mobile wireless communication devices, such as a cellular telephone or a wireless personal digital assistant, can provide a wide variety of communication services including, for example, voice communication, text messaging, internet browsing, and electronic mail. Mobile wireless communication devices can operate in a wireless communication network of overlapping "cells", each cell providing a geographic area of wireless signal coverage that extends from a radio network subsystem located within the cell. The radio network subsystem provides an "air interface" through which the mobile wireless communication device can access the wireless communication network. Whether idle or actively connected, a mobile wireless communication device can be associated with a "serving" cell in a wireless communication network and be aware of "neighbor" cells to which the mobile wireless communication device can also associate. The quality of the air interface between the mobile wireless communication device and the radio network subsystem can vary based on the distance between them and on interference included in received signals at either end of the air interface. As the mobile wireless communication device moves further away from the radio network subsystem, eventually a neighbor cell can provide an equal or better performing communication link than the current serving cell. The mobile wireless communication device can include a process for determining if and when to switch cells with which it associates. If the mobile wireless communication device is actively connected to the serving cell, then the process of switching to a neighbor cell is known as "handoff." For a mobile wireless communication device that is associated with a serving cell in an "idle" state, the process of associating with a neighbor cell is known as "cell reselection."

When a mobile wireless communication device seeks to associate with a wireless communication network, such as after a power on initialization, the mobile wireless communication device can search for cells located in its vicinity. Initially locating and connecting to a serving cell by a mobile wireless communication device can be referred to as "cell selection". If a cell is located that is deemed suitable to provide a wireless communication link, e.g. when signals received by the mobile wireless communication device from the radio network subsystem located in the cell exceeds certain performance quality metrics, then the mobile wireless communication device can associate with that cell. The mobile wireless communication device can be referred to as being "camped" on a particular "serving" cell in the wireless communication network of cells. While camped on the serving cell, the mobile wireless communication device can listen to messages broadcast from the serving cell's radio network subsystem as well as from other radio network subsystems located in neighbor cells. System information that specifies certain properties of the serving cell and its neighbor cells can be broadcast regularly by the serving cell's radio network subsystem. If the mobile wireless communication device determines that a neighbor cell can provide a higher quality communication link than a current serving cell, then the mobile wireless communication device can disassociate from the current serving cell and associate with the neighbor cell, in a process known as "cell reselection".

Initial cell selection and cell reselection can include reading a number of different system information messages transmitted by the radio network subsystems in the wireless communication network. Each system information message can be transmitted at regular intervals. By waiting to read the system information messages when broadcast, the mobile wireless communication device can be assured of using the latest system parameter values during the cell evaluation process. Some of the system information messages can change infrequently, however, and the mobile wireless communication device can incur an unnecessary delay when waiting to read the most recent system information if the same information has been read before. For example, when there is a momentary or short time interval loss of service by the mobile wireless communication device or when the mobile wireless communication device reacquires the same cell as previously used, it can be desired to shorten the lengthy cell search and selection procedure by reusing system parameters that were read earlier and stored in the mobile wireless communication device.

SUMMARY OF DESCRIBED EMBODIMENTS

This paper describes various embodiments that relate to methods and apparatus for fast cell selection by a mobile wireless communication device in a wireless communication network.

In a representative embodiment, a method includes at least the following steps performed by a mobile wireless communication device. The mobile wireless communication device detects that a first wireless cell with which it is associated fails at least one criterion in a set of suitability criteria. The set of suitability criteria are stored in the mobile wireless communication device. After the first wireless cell fails suitability, the mobile wireless communication device searches for and locates a set of candidate wireless cells with which to associate. The mobile wireless communication device measures at least one received signal metric for each candidate wireless cell in the set of candidate wireless cells. When the mobile wireless communication device determines that a candidate cell in the set of candidate wireless cells is identically the first wireless cell, the mobile wireless communication device evaluates the suitability of the candidate wireless cell. The suitability evaluation uses one or more criteria in the stored set of suitability criteria for the first wireless cell and the measured at least one received signal metric for the candidate wireless cell. The mobile wireless communication device associates with the candidate wireless cell when the candidate wireless cell satisfies one or more criteria in the stored set of suitability criteria.

In another representative embodiment, a mobile wireless communication device includes an application processor and a transceiver configured to select a cell in a wireless communication network with which to connect. The mobile wireless communication device is configured to select the cell by detecting a loss of radio frequency connection between the transceiver in the mobile wireless communication device and a first cell in the wireless communication network. The mobile wireless communication device is configured to locate a set of candidate cells in the wireless communication network with which to connect. The mobile wireless communication device is configured to determine a subset of located candidate cells that match to cell suitability criteria stored in the mobile wireless communication device. The mobile wireless communication device is configured to select a cell in the subset of located candidate cells based on measuring cell suitability using the stored cell suitability criteria and associate with the selected cell. The cell suitability criteria are stored in the mobile wireless communication device prior to detecting the loss of radio frequency connection.

In a further representative embodiment, a computer readable medium for storing non-transitory computer program code executable by a processor in a mobile wireless communication device for selecting a cell in a wireless network with which the mobile wireless communication device associates includes at least the following non-transitory computer program codes. A non-transitory computer program code for detecting that a first cell fails one or more suitability criteria stored in the mobile wireless communication device. A non-transitory computer program code for searching for and locating a set of candidate cells with which to associate the mobile wireless communication device. A non-transitory computer program code for determining if one of the candidate cells in the set of candidate cells is identically the first cell. A non-transitory computer program code for evaluating suitability of the first cell using the one or more stored suitability criteria when one of the candidate cells is the first cell. A non-transitory computer program code for associating with the first cell when one of the candidate cells in the set of candidate cells is identically the first cell and the first cell is suitable.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Figure 1:
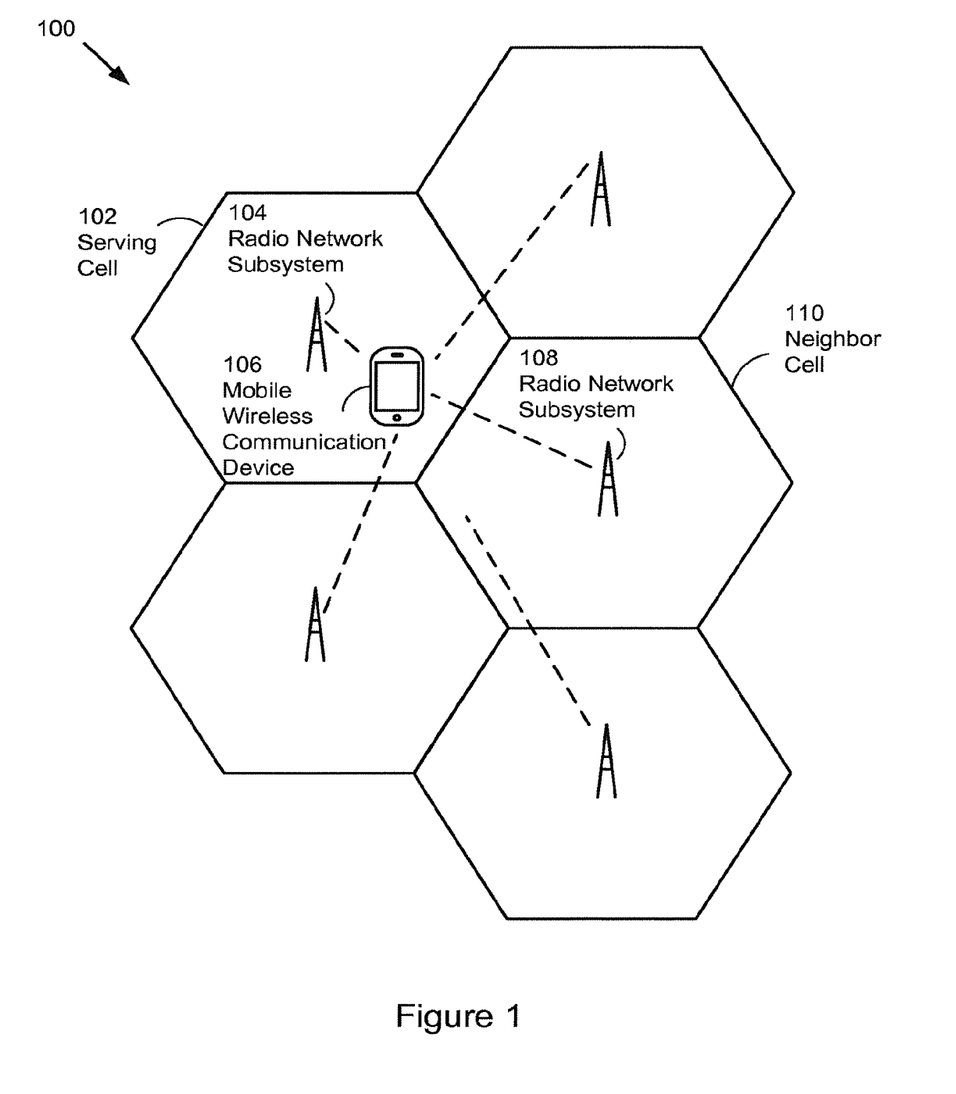
FIG. 1 illustrates a mobile wireless communication device located within a wireless cellular communication network.

A mobile wireless communication device 106 can include the capability to connect seamlessly with a wireless communication network 100 of overlapping wireless communication cells, each wireless communication cell covering a geographic area extending from a radio network subsystem 104 as illustrated in FIG. 1. The mobile wireless communication device 106 can receive communication signals from radio network subsystems located in different cells in the wireless communication network 100, and each cell can be located at a different distance from the mobile wireless communication device 106. As signal strength of a wireless communication signal decays proportionally to the square of the distance between a transmitting end and a receiving end, the mobile wireless communication device 106 can monitor the received signal strength from several different cells in the wireless communication network 100 to determine a cell having the strongest received signal at any given time. As the mobile wireless communication device 106 changes locations within a wireless communication network 100, the received signal strength can vary substantially, and thus the cell from which the mobile wireless communication device 106 receives the strongest signal can change.

After a "power on" initialization, or similarly when entering a "new" wireless communication network, the mobile wireless communication device 106 can seek to associate with a cell in the wireless communication network 100, i.e. to "select" a cell. A radio network subsystem in each cell of the wireless communication network 100 can broadcast a series of system information messages at regular intervals that identify salient characteristics of the radio network subsystem as well as certain properties of radio network subsystems located in neighbor cells. Based on measurements of received signal strength, or other quality metrics such as carrier to interference ratios, the mobile wireless communication device 106 can associate with a radio network subsystem 104, thereby "selecting" a particular cell within the wireless communication network 100 as a "serving" cell 102. The process of associating with a "serving" cell can be also known as "camping" on that cell.

After associating with the serving cell 102, the mobile wireless communication device 106 can initiate connections (such as voice or data calls) with the wireless communication network 100 through the radio network subsystem 104 of the serving cell 102. The radio network subsystem 104 in the serving cell 102 can also initiate connections to the mobile wireless communication device 106, as the wireless network 100 can be aware of the association between the serving cell 102 and the mobile wireless communication device 106. While "camped" on the serving cell 102, the mobile wireless communication device 106 can monitor broadcast signals from the radio network subsystem 104 that include system information to determine if and when to associate with a different radio network subsystem 108 in a neighbor cell 110.

System information can be communicated from the radio network subsystem 104 in the serving cell 102 to the mobile wireless communication device 106 camped on the serving cell through system information messages (also called system information blocks). Parameters associated with a common function can be grouped together in a system information message of a particular type. As a representative example, the third-generation (3G) mobile communication technology known as Universal Mobile Telecommunications System (UMTS), which is developed and maintained by the 3$^{rd}$ Generation Partnership Project (3GPP), includes a radio resource control (RRC) protocol that organizes system information into one of a number of different system information blocks (SIBs). In order to enable mobile wireless communication devices 106 in the serving cell 102 to determine which SIBs are broadcast by the radio network subsystem 104 and in which specific system frames the SIBs will occur, a master information block (MIB) can be broadcast regularly that can provide scheduling information about the SIBs. The MIB can be transmitted on a broadcast control (BCCH) logical channel, which can be mapped to a broadcast (BCH) transport channel.

Figure 2:
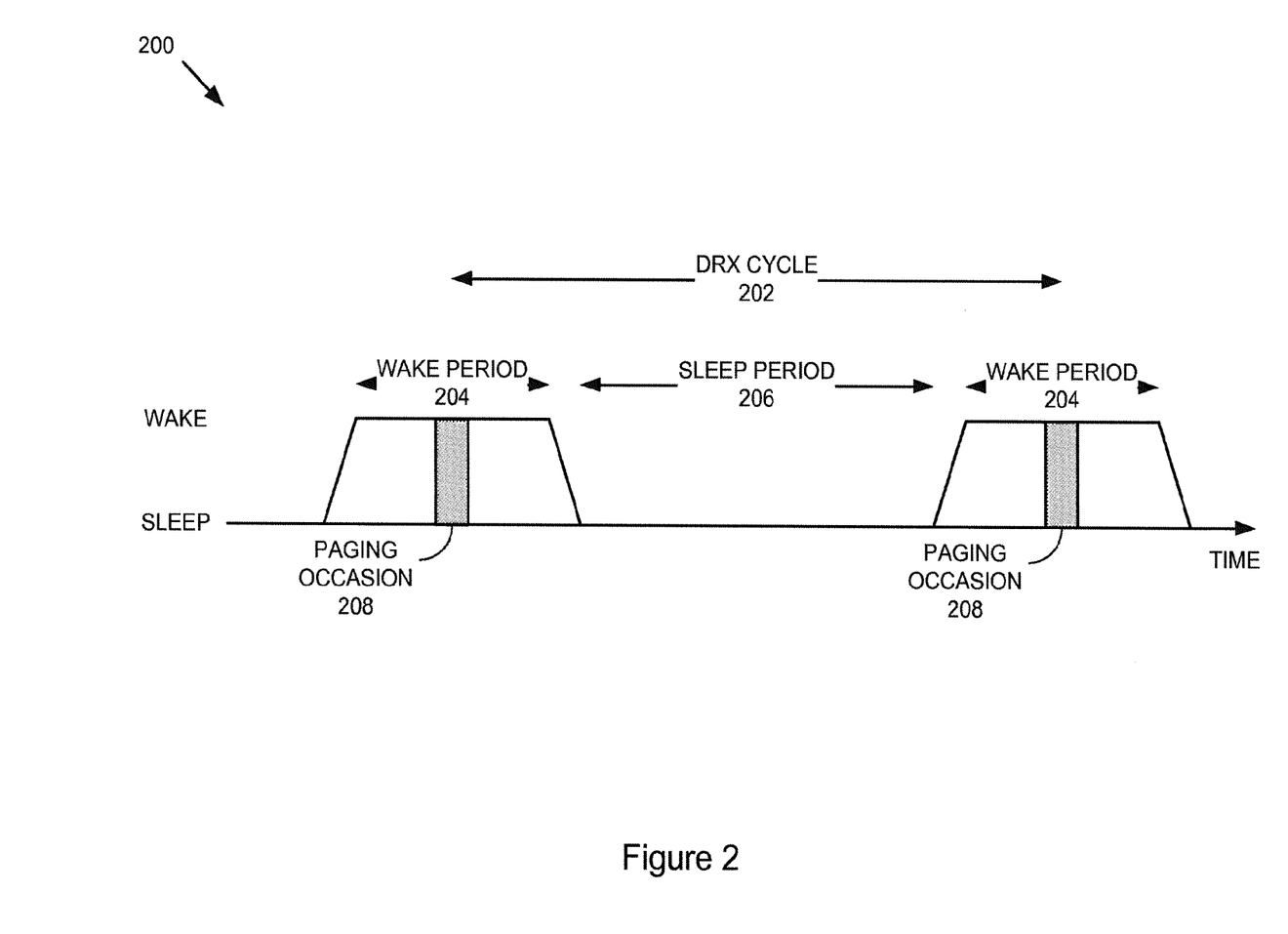
FIG. 2 illustrates a discontinuous reception cycle for a mobile wireless communication device.

In a representative embodiment, the MIB can be broadcast once every 8 system frames of 10 ms each (i.e. once per 80 ms). The scheduling of the MIB can be thus static and regular, while the scheduling of SIB blocks of different types can be dynamic and irregular. The MIB can be broadcast frequently by the radio network subsystem 104 in the serving cell 102 to ensure there is low latency when the mobile wireless communication device 106 reads a current MIB; however, the system information for a cell can change at a slower rate than the MIB broadcast rate, so reading every MIB that is broadcast every 80 ms can be inefficient. Instead, the mobile wireless communication device 106 can receive an indication when system information changes through a paging indication on a paging (PCH) transport channel broadcast by the radio network subsystem 104. As shown in FIG. 2, a mobile wireless communication device 106 can cycle between "sleep" periods and "wake" periods in a cycle known as discontinuous reception (DRX) 202. During a "wake" period 204, the mobile wireless communication device 106 can monitor a paging indicator channel (PICH) during a paging occasion 208. If system information has changed, as indicated by a message received on the PICH, then the mobile wireless communication device 106 can read the next broadcast MIB for additional system information. In between wake periods 204, the mobile wireless communication device 106 can conserve battery power by entering sleep periods, during which time one or more blocks of circuitry, such as radio frequency transceivers, in the mobile wireless communication device 106 can be powered down. The frequency of paging occasions can be set by the radio network subsystem 104 in the serving cell 102, while the DRX cycle 202 can be managed by the mobile wireless communication device 106 to ensure the wake periods 204 align with the paging occasions 208.

Figure 3:
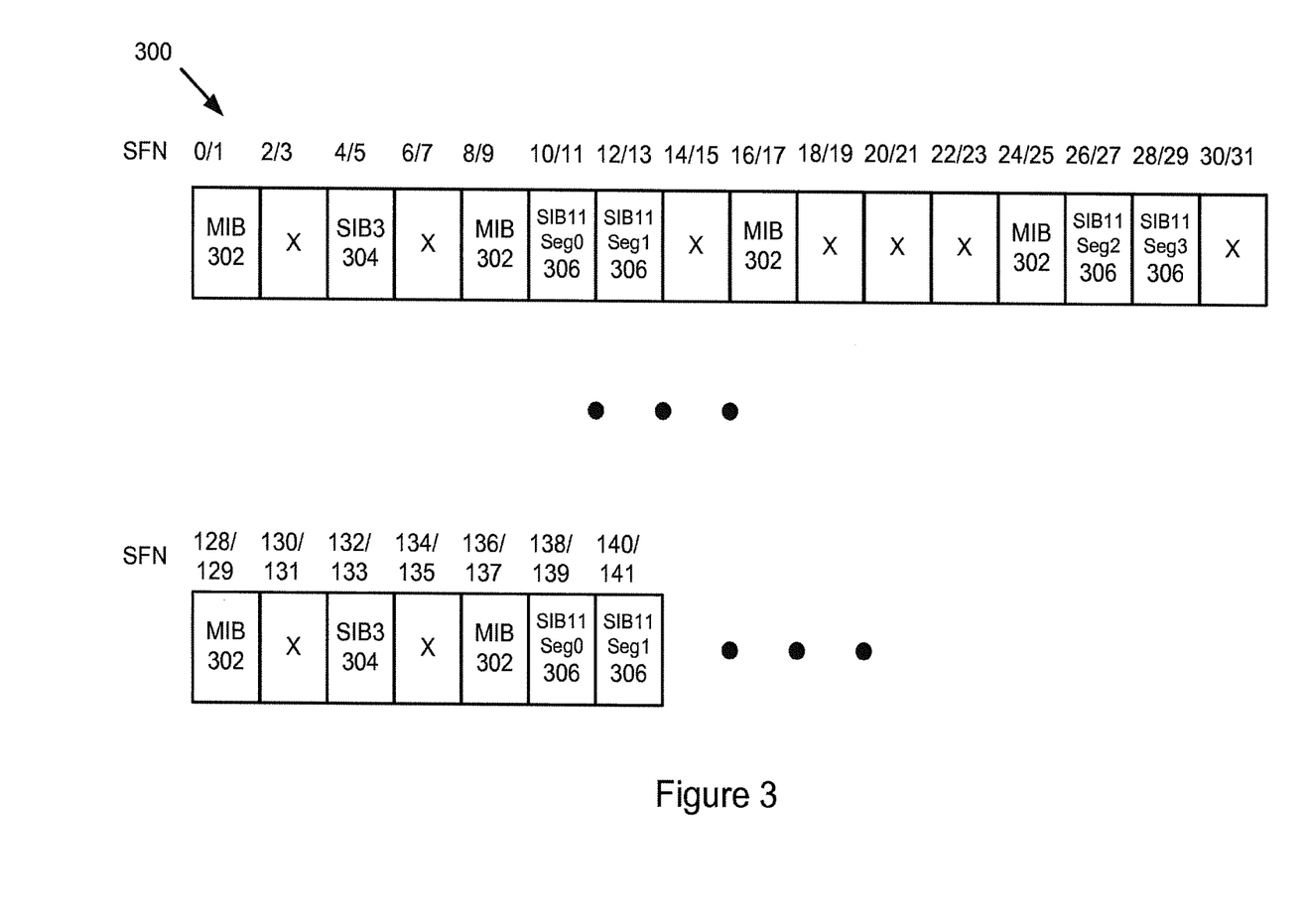
FIG. 3 illustrates a sequence of transmitted system information blocks used for cell selection and reselection.

During a paging occasion 208, the mobile wireless communication device can evaluate the current serving cell using a set of suitability criteria communicated in one or more system information blocks. FIG. 3 illustrates a portion of a sequence 300 of system frames in which a master information block MIB 302 and two types of system information blocks 302/306 are transmitted by the radio network subsystem 104 of the serving cell 102 on a broadcast common control channel (BCCH). In the UMTS wireless communication protocol cell reselection parameters for the current serving cell can be transmitted using a system information block 302 of type 3 (SIB3), while reselection parameters for a set of neighbor cells can be transmitted using a system information block 306 of type 11 (SIB11). The system information blocks can repeat at regular intervals, and the repetition frequency for each type of system information block can vary. As shown in FIG. 3, the MIB 302 repeats every 8 system frames (80 ms), while SIB3 304 and SIB 11 306 repeat every 128 system frames (1280 ms). (Other SIB types are not shown in FIG. 3 but can be included in one or more of the system frames marked by an 'x'.) The maximum repetition count for all types of system information blocks can be limited to 128 system frames, and thus all system information blocks can be read over a period of 1.28 seconds. To minimize battery power drain, the mobile wireless communication device 106 can learn the schedule of SIB transmissions from the MIB 302 and wake to read only those SIBs that can be required and can sleep during the time intervals in between.

During a cell selection process, the mobile wireless communication device 106 can wait for a current. SIB3 304 in order to evaluate suitability criteria for the current serving cell 102. As values of previously read SIB3 304 (or other system information blocks) can be stored in memory on the mobile wireless communication device 106, the cell selection process can be accelerated by using previously read values for the SIB3 304. Suitability criteria that can be specified in the SIB3 304 can include a minimum received power level and a minimum received signal quality level. During a wake period 204, the mobile wireless communication device 106 can measure a common pilot channel (CPICH) to determine a received signal code power (RSCP) as well as a signal to interference ratio (Ec/Io) and compare the received values against the parameters read from the SIB3 304. As a representative embodiment, the mobile wireless communication device 106 in a UMTS wireless communication network 100 can deem a serving cell 102 suitable if the following equations are satisfied.

$$Srxlev>0$$

$$Squal>0$$

where the parameters Srxlev and Squal can be calculated as follows.

$$Srxlev=Qrxlevmeas-Qrxlevmin-Pcomp$$

$$Squal=Qqualmeas-Qqualmin$$

The parameters Qrxlevmin, Qqualmin and Pcomp can be specified by the radio network subsystem 104 in the SIB3 304, while the parameters Qqualmeas and Qrxlevmeas can be measured by the mobile wireless communication device 106. If the serving cell 102 is found "unsuitable" over a series of consecutive DRX cycles 202, then the mobile wireless communication device can initiate a cell reselection process. The number of consecutive DRX cycles that can trigger a cell reselection can be transmitted by the radio network subsystem 104 in the SIB3 304. The SIB3 304 can also include additional parameters Sintrasearch, Sintersearch, SinterRAT that can trigger an intra-frequency, inter-frequency or inter-"radio access technology" cell search procedure respectively if the calculated value Squal falls below a level specified by these additional parameters.

Figure 4:
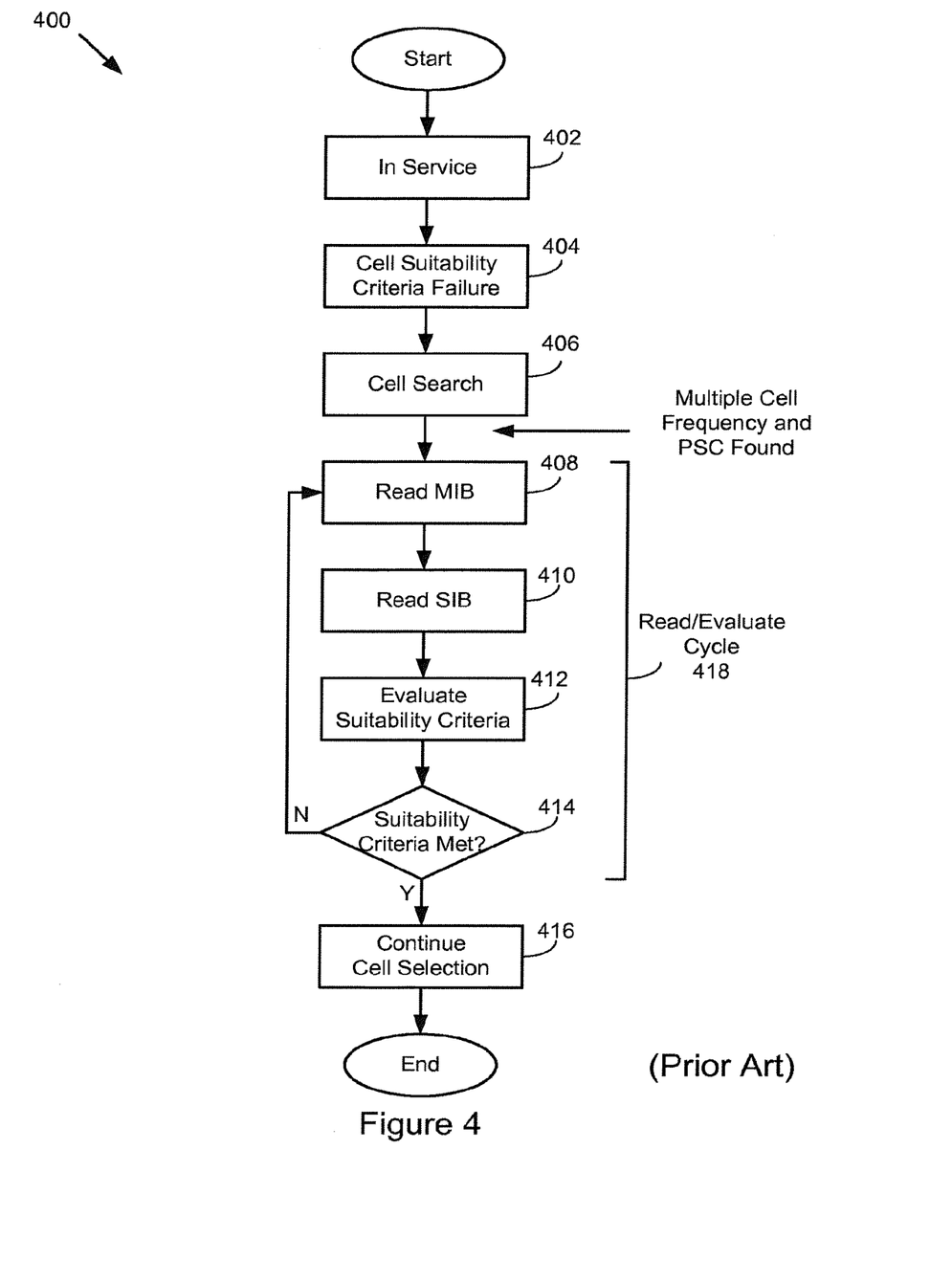
FIG. 4 illustrates a prior art method for performing cell selection.

FIG. 4 illustrates a portion of a prior art method 400 for a cell selection process for a mobile wireless communication device 106. Initially in step 402, the mobile wireless communication device 106 can be "in service" associated with the serving cell 102 of the wireless communication network 100. During one or more DRX cycles 202, in step 404, the mobile wireless communication device can measure the serving cell 102 signal quality and can determine that the serving cell 102 does not satisfy the suitability criteria specified by the SIB3 304 parameters. Cell suitability failure can occur because the received and measured signal quality falls below certain thresholds in one or more DRX cycles 202. In step 406, the mobile wireless communication device 106 can conduct a search for available cells. The cell search procedure in step 406 can include sub-steps (not shown) that acquire time slot and frame synchronization using synchronization codes followed by a determination of a primary scrambling code for each cell found. At the end of the cell search in step 406, the mobile wireless communication device 106 can have for each cell found, a Universal Terrestrial Radio Access (UTRA) Absolute Radio Frequency Channel Number (UARFCN), a primary scrambling code (PSC), a received signal code power (RSCP) value and a chip energy (Ec/Io) value.

For the multiple cells found in step 406, the mobile wireless communication device can "rank" the cells according to ranking criteria using the RSCP and Ec/Io values. For the "best" cell found, the mobile wireless communication device can determine suitability of the cell in a read/evaluation cycle 418 of several steps. In step 408, the mobile wireless communication device 106 can read the MIB on the BCCH. Using scheduling information from the MIB, the mobile wireless communication device can read in step 410 one or more SIBs, such as SIB3. In step 412, the measured RSCP and Ec/Io values can be compared against suitability criteria read from SIB3 to determine whether the cell is suitable. If the cell satisfies the suitability criteria as determined in step 414, then the cell selection procedure can continue in step 416. If the cell does not satisfy the suitability criteria, however, then the read/evaluate cycle 418 can repeat using the "next best" cell found in the cell search of step 406. The read/evaluate cycle 418 can take several seconds to complete before cell selection continues. This time can lengthen the cell selection procedure even when the mobile wireless communication device 106 finds a previous cell for which suitability criteria can have been already read and stored in the mobile wireless communication device 106.

Figure 5:
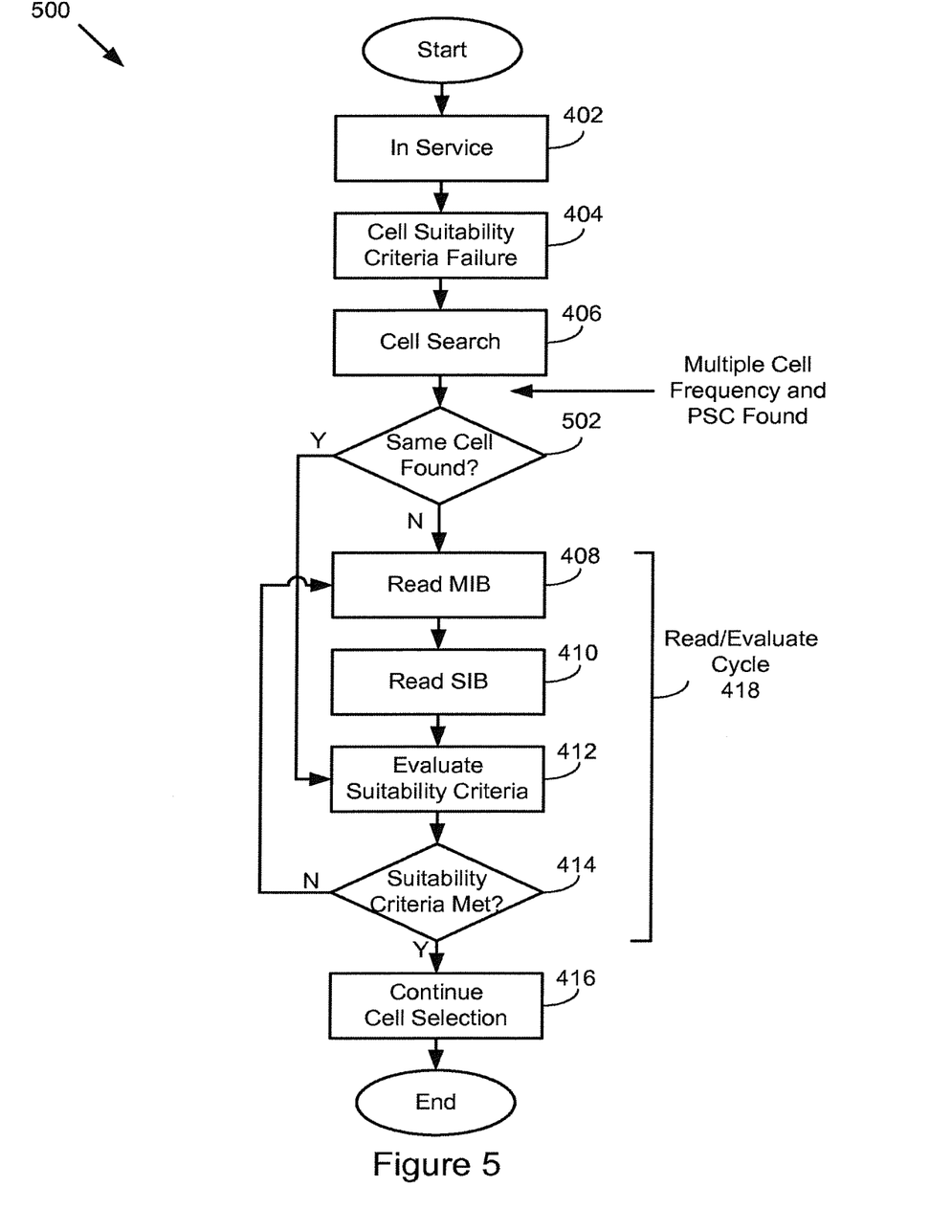
FIG. 5 illustrates a representative method for performing cell selection with early suitability criteria evaluation.

A faster cell selection process can be accomplished using a method 500 shown in FIG. 5. As in FIG. 5, the mobile wireless communication device 106 can search for multiple cells in step 406 following a cell suitability criteria failure in step 404. In step 502, the mobile wireless communication device 106 can determine if one of the cells found has been previously used and for which SIB values have been stored in the mobile wireless communication device 106. If one of the found cells is the same as a previously used cell then the mobile wireless communication device 106 can use stored SIB3 values to evaluate the suitability of the cell in step 412 bypassing the MIB and SIB reading steps 408 and 410. If the cell suitability criteria are met in step 414, then the cell selection process can continue in step 416. By identifying a "same cell" in step 502 and bypassing the MIB/SIB steps 408/410, and with successful suitability criteria met in step 414, the mobile wireless communication device 106 can shorten the cell selection process significantly by eliminating the read/evaluate cycle 418.

In order for the proposed method 500 to function properly, the wireless communication network 100 can ensure that all cells found in the cell search of step 406 have unique primary scrambling codes (PSC) by not repeating the use of the same PSC in a given area. This network radio frequency planning rule can typically be employed. The mobile wireless communication device 106 can determine if the primary scrambling code found in the cell search of step 406 that matches a stored cell can actually be from the stored cell, i.e. the matching PSC does actually represent the same cell as previously used, by evaluating movements of the mobile communication device 106. As a representative embodiment, the mobile wireless communication device 106 can store a set of location coordinate values (e.g. GPS values) for each cell in addition to the PSC when storing the SIB values internally for the cell identified by the PSC. The mobile wireless communication device 106 can compare a current location coordinate value to the stored location value associated with the matching PSC to determine if the mobile wireless communication device 106 is observing the same cell. The current location value and the stored location value need not match exactly but can be within a range of each other that represents a typical network planning distance over which a PSC value can be considered unique. As another representative embodiment, the mobile wireless communication device 106 can estimate a distance difference between a "current" found cell from the cell search 406 and the "previous" cell by keeping track of the elapsed time from the cell suitability criteria failure in step 404 and using knowledge of an average velocity of movement of the mobile wireless communication device 106.

Figure 6:
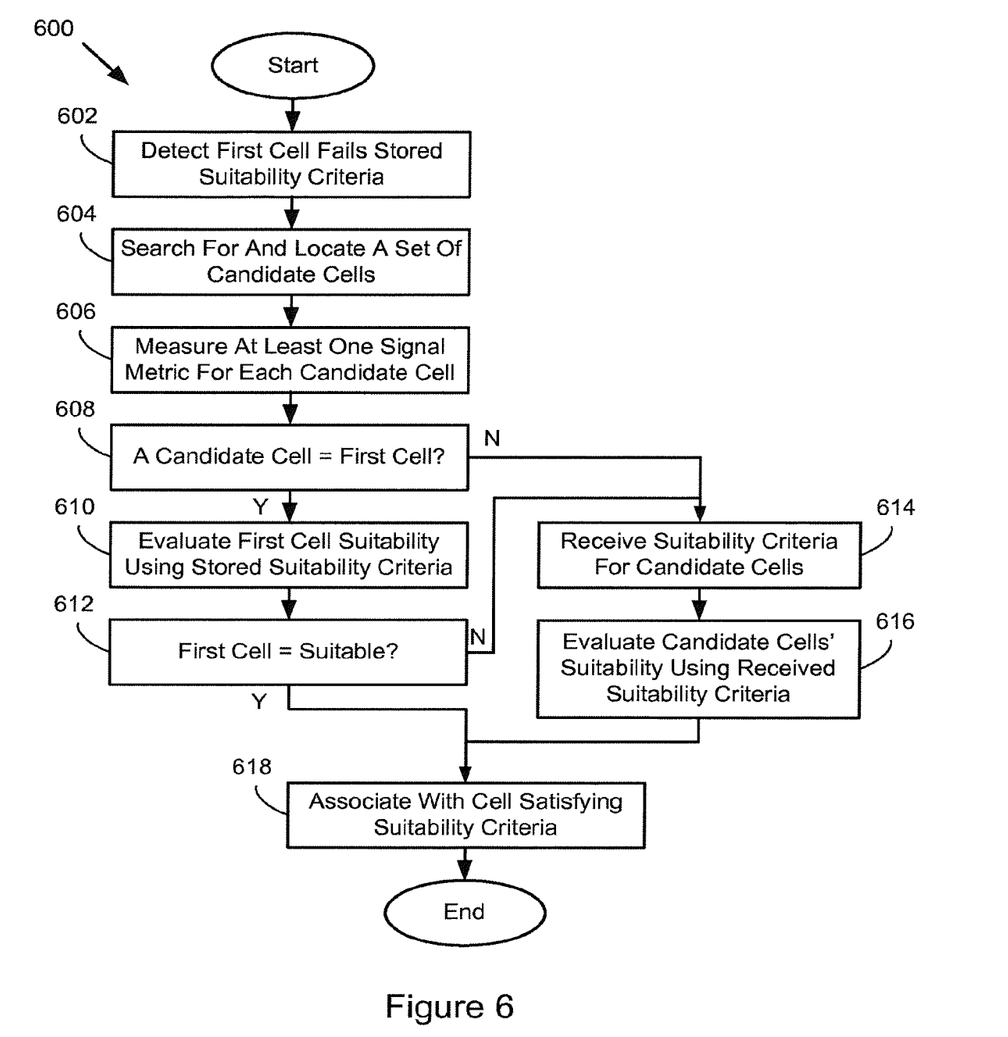
FIG. 6 illustrates a representative method for evaluating cell suitability and associating with a suitable cell.

FIG. 6 illustrates a representative method by the mobile wireless communication device 106 for evaluating cell suitability and associating with a suitable cell in a wireless communication network 100. The mobile wireless communication device 106, in step 602, can detect a first cell fails one or more stored suitability criteria. The stored suitability criteria can be stored in the mobile wireless communication device 106 before detecting of the first cell failure. Cell failure can include loss of service, loss of suitable signal strength, loss of suitable signal quality or any other measures by which the mobile wireless communication device 106 and/or the wireless communication network 100 can conclude that a connection is not suitable for transmission. In response to cell suitability failure, in step 604, the mobile wireless communication device 106 can search for and locate a set of candidate cells with which to possibly associate in the wireless communication network 100. The set of candidate cells can include in some instances and can not include in other instances the previously failed first cell.

In step 606, the mobile wireless communication device 106 can measure at least one signal metric for each candidate cell in the located set of candidate cells. Signal metrics can include measuring a signal that indicates a carrier frequency, a frequency channel, a frequency code, a signal code strength, a signal quality strength or any other measures than can identify the candidate cell and/or qualify the candidate cell as suitable to connect with by the mobile wireless communication device 106. In step 608, the mobile wireless device can determine if one of the candidate cells in the located set of candidate cells is identically the first cell that failed suitability in step 602. If one of the candidate cell's is identically the first cell, then the mobile wireless communication device in step 610 can evaluate suitability of the first cell using one or more of the stored suitability criteria. Evaluating suitability can include determining if the first cell satisfies the one or more stored suitability criteria. The mobile wireless communication device 106 can determine that the first cell is suitable in step 612 and subsequently associated with the first cell in step 618.

If the candidate cell is not the first cell in step 608, or if the first cell is not suitable in step 612, then the mobile wireless communication device can receive suitability criteria for one or more of the candidate cells in the located set of candidate cells in step 614. The wireless communication network 100 can broadcast the suitability criteria at regular intervals or according to a schedule known by or communicated to the mobile wireless communication device 106 or by an indication on a paging channel, or by any other means by which the mobile wireless communication device 106 can determine when to listen for and receive the transmitted suitability criteria. In step 616, the mobile wireless communication device 106 can evaluate each candidate cell's suitability using the suitability criteria received from the wireless communication network 100. One or more of the candidate cells can satisfy the suitability criteria. In step 618 the mobile wireless communication device 106 can associate with one of the candidate cells that satisfy the suitability criteria.

Figure 7:
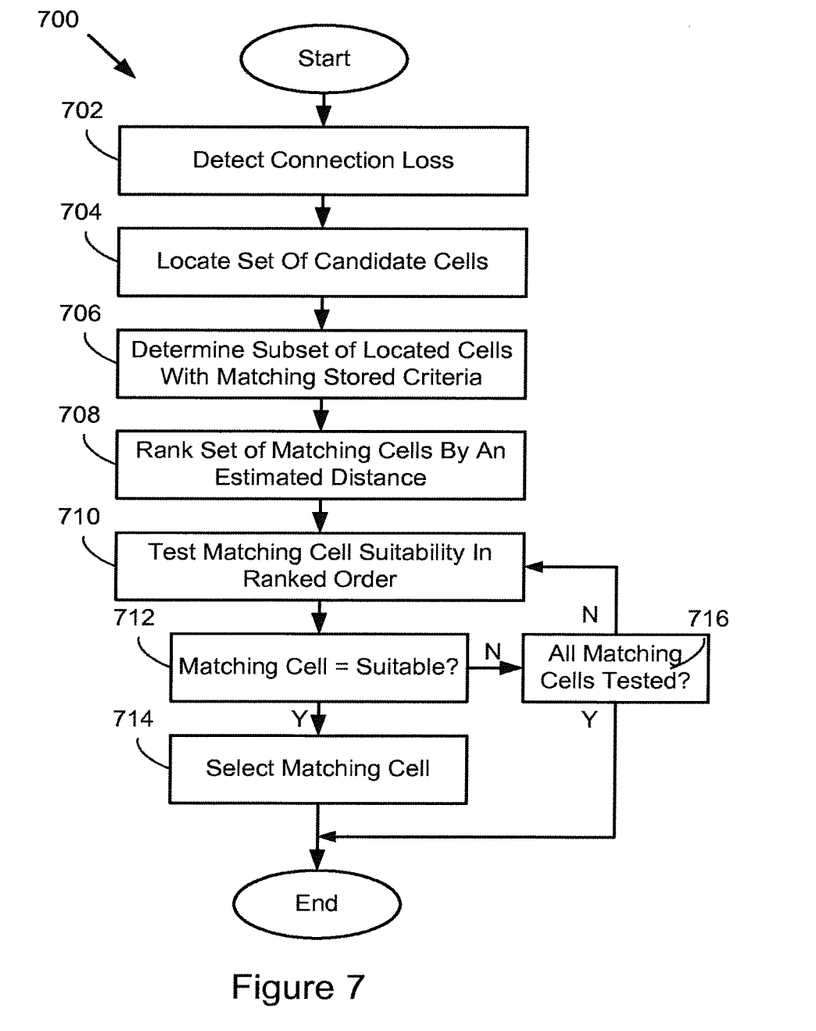
FIG. 7 illustrates a representative method for testing cell suitability and associated with a suitable cell.

FIG. 7 illustrates a representative method for testing cell suitability by the mobile wireless communication device 106 and associating with a suitable cell. In step 702, the mobile wireless communication device can detect a loss of connection between the mobile wireless communication device 106 and a cell in the wireless communication network 100. In step 704 a set of candidate cells can be located by the mobile wireless communication device. Locating the candidate cells can include searching for cells by using information broadcast by the wireless communication network. In step 706 a subset of the set of located candidate cells can be matched using criteria stored in the mobile wireless communication device 106. In step 708, the subset of matching cells can be ranked by an estimated distance from the mobile wireless communication device's current geographic position or the mobile wireless communication device's past geographic position when the connection loss was detected in step 702. Each of the matching cell's can be tested for cell suitability in ranked order using one or more stored suitability criteria in step 710. A matching cell can be found suitable in step 712, and the mobile wireless communication device 106 can select to associate with the matching suitable cell in step 714. Checking for cell suitability in steps 710 and 712 can proceed through all of the matching cells in ranked order and the mobile wireless communication device 106 can select to associate with a suitable cell or until all cells can be found unsuitable in step 716.

Figure 8:
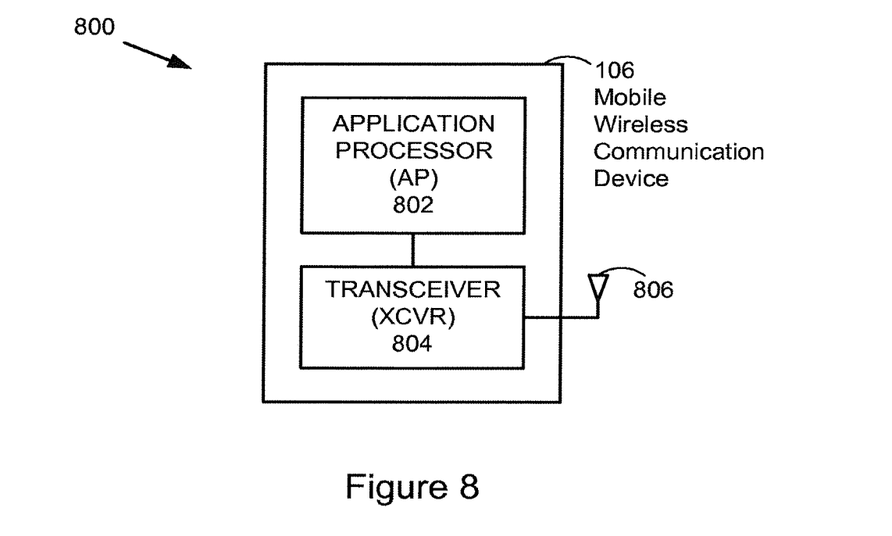
FIG. 8 illustrates processing units of a mobile wireless communication device.

FIG. 8 illustrates processing elements of a representative mobile wireless communication device 106 including a transceiver 804 and an application processor 802. The mobile wireless communication device 106 can transmit and receive radio frequency signals through an antenna 806 connected to the transceiver. The transceiver 804 can process physical layer radio frequency signals and link layer protocol data units. The transceiver 804 can transmit and receive packetized messages with the application processor 802, which can establish higher layer connections of the mobile wireless communication device 106 to endpoints through the wireless communication network 100. In some embodiments, the application processor 802 and the transceiver 804 can be included in the same integrated circuit device or package, while in other embodiments, the application processor 802 and the transceiver 804 can be separate. Detecting connection loss or cell suitability failure can occur in either the application processor 802 or the transceiver 804 or in a combination of both as can other steps described for FIGS. 5, 6 and 7.

Various aspects of the described embodiments can be implemented by software, hardware or a combination of hardware and software. The described embodiments can also be embodied as computer program code on a computer readable medium. The computer readable medium is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A mobile device, comprising:
a processor;
a wireless interface in data communication with the processor; and
logic in data communication with the processor and the wireless interface, the logic configured to cause the mobile device to:
detect when a first cell, to which the mobile device is connected, does not meet one or more suitability criteria;
locate one or more cells for possible connection with the mobile device;
determine whether a candidate cell of the one or more cells is the first cell; and
when the candidate cell is determined to be the first cell:
evaluate whether the candidate cell satisfies the one or more suitability criteria, wherein the evaluation is performed without reading system information messages to obtain the one or more suitability criteria for the candidate cell; and
connect with the candidate cell when the candidate cell is determined to satisfy the one or more suitability criteria;
when none of the one or more cells is determined to be the first cell:
read one or more system information messages to obtain suitability criteria for the one or more cells; and
evaluate whether a second candidate cell of the one or more cells satisfies corresponding suitability criteria; and
connect with the second candidate cell when the second candidate cell is determined to satisfy the corresponding suitability criteria.

2. The mobile device of claim 1, wherein the one or more suitability criteria comprise at least one of a received power level parameter and a received signal quality parameter.

3. The mobile device of claim 1, wherein:
the one or more suitability criteria are stored in the mobile device prior to the detection; and
the evaluation is based at least in part on the stored one or more suitability criteria.

4. The mobile device of claim 3, wherein the one or more suitability criteria are determined from one or more system information blocks received from the first cell before the mobile device detects the first cell does not meet the one or more suitability criteria.

5. The mobile device of claim 1, wherein the mobile device determines whether a candidate cell of the one or more cells is the first cell based at least in part on an estimation of a geographic location of the mobile device.

6. The mobile device of claim 5, wherein the estimation of the geographic location of the mobile device further comprises an estimation of a geographic location of the first cell.

7. The mobile device of claim 1, wherein each cell of the one or more cells has a unique primary scrambling code (PSC).

8. A method of operating a mobile device, the method comprising:
- detecting a connection failure with a first cell;
- locating a set of candidate cells for possible association with the mobile device;
- determining whether at least one candidate cell of the set of candidate cells is the first cell previously associated with the mobile device;
- when the at least one candidate cell is the first cell:
  - evaluating the first cell using one or more suitability criteria, the evaluation based at least in part on information for the first cell stored in the mobile device prior to the detected connection failure; and
  - associating with the first cell when the first cell satisfies the one or more suitability criteria; and
- when no candidate cells in the set of candidate cells is determined to be the first cell:
  - receiving suitability criteria for one or more candidate cells in the set of candidate cells;
  - determining whether an identified candidate cell of the set of candidate cells satisfies the received suitability criteria; and
  - associating with the identified candidate cell when the identified candidate cell satisfies the received suitability criteria.

9. The method of claim 8, wherein determining whether at least one candidate cell of the set of candidate cells is the first cell is based at least in part on estimating a locational change of the mobile device.

10. The method of claim 9, wherein the estimation of the locational change of the mobile device is based at least in part on a time elapsed from the detection of the connection failure until locating the set of candidate cells.

11. The method of claim 9, wherein the estimation of the locational change of the mobile device is based at least in part on a rate of displacement of the mobile device.

12. The method of claim 9, wherein the estimation of the locational change of the mobile device is based at least in part on a comparison between an estimated location of the mobile device and an estimated location of the first cell.

13. The method of claim 8, wherein determining whether the identified candidate cell satisfies the one or more suitability criteria comprises at least measuring a received signal quality of the identified candidate cell.

14. The method of claim 8, wherein locating the set of candidate cells comprises at least receiving a radio frequency signal identifying the candidate cell.

15. The method of claim 8, wherein each candidate cell of the set of candidate cells has a unique primary scrambling code (PSC).

16. The method of claim 8, wherein the information for the first cell comprises information associated with one or more system information blocks received from the first cell before the mobile device detects the connection failure with the first cell.

17. A non-transitory computer readable apparatus comprising a plurality of instructions that, when executed by a processor, cause a mobile device to:
- detect a connection failure with an associated cell;
- locate a set of candidate cells for possible association with the mobile device;
- determine whether a candidate cell of the set of candidate cells is the associated cell; and
- when the candidate cell is the associated cell:
  - evaluate the candidate cell using at least one suitability criteria, the evaluation based at least in part on suitability criteria for the associated cell stored in the mobile device prior to the detected connection failure; and
  - associate the mobile device with the candidate cell when the candidate cell satisfies the at least one suitability criteria,
  - wherein the evaluation is performed without reading system information messages to obtain the at least one suitability criteria for the candidate cell; and
- when no candidate cells in the set of candidate cells is determined to be the associated cell:
  - receiving suitability criteria for one or more of the candidate cells in the set of candidate cells;
  - determining whether an identified candidate cell in the set of candidate cells satisfies the received suitability criteria; and
  - associating the mobile device with the identified candidate cell when the identified candidate cell satisfies the received suitability criteria.

18. The non-transitory computer readable apparatus of claim 17, wherein the determination of whether the candidate cell is the associated cell is based at least in part on an estimated geographical location of the mobile device.

19. The non-transitory computer readable apparatus of claim 17, wherein the suitability criteria for the associated cell is based at least in part on one or more system information messages received from the associated cell before the mobile device detects the connection failure with the associated cell.

20. The non-transitory computer readable apparatus of claim 17, wherein the at least one suitability criteria comprises a parameter relating to a received signal quality.

* * * * *

UNITED STATES PATENT AND TRADEMARK OFFICE
CERTIFICATE OF CORRECTION

PATENT NO. : 9,020,499 B2  
APPLICATION NO. : 13/663342  
DATED : April 28, 2015  
INVENTOR(S) : Giri Prassad Deivasigamani et al.

Page 1 of 1

It is certified that error appears in the above-identified patent and that said Letters Patent is hereby corrected as shown below:

In the claims

Column 10, line 30 (Claim 1, line 14): "first cell; and" should read -- first cell; --.

Column 10, line 39 (Claim 1, line 23): "criteria;" should read -- criteria; and --.

Signed and Sealed this  
Twenty-fifth Day of August, 2015

Michelle K. Lee  
*Director of the United States Patent and Trademark Office*